(12) United States Patent
Wu et al.

(10) Patent No.: US 11,762,892 B2
(45) Date of Patent: *Sep. 19, 2023

(54) LOCATION-AWARENESS SEARCH ASSISTANCE SYSTEM AND METHOD

(71) Applicant: YAHOO ASSETS LLC, Dulles, VA (US)

(72) Inventors: Hui Wu, Sunnyvale, CA (US); Huming Wu, San Jose, CA (US); Shenhong Zhu, Santa Clara, CA (US); Jiuhe Gan, Cupertino, CA (US); Hang Su, Vienna, VA (US)

(73) Assignee: YAHOO ASSETS LLC, New York, NY (US)

( * ) Notice: Subject to any disclaimer, the term of this patent is extended or adjusted under 35 U.S.C. 154(b) by 277 days.

This patent is subject to a terminal disclaimer.

(21) Appl. No.: 16/705,670

(22) Filed: Dec. 6, 2019

(65) Prior Publication Data

US 2020/0151205 A1 May 14, 2020

Related U.S. Application Data

(63) Continuation of application No. 14/727,081, filed on Jun. 1, 2015, now Pat. No. 10,503,764.

(51) Int. Cl.
*G06F 16/00* (2019.01)
*G06F 16/332* (2019.01)
(Continued)

(52) U.S. Cl.
CPC ...... *G06F 16/3322* (2019.01); *G06F 16/2425* (2019.01); *G06F 16/24578* (2019.01);
(Continued)

(58) Field of Classification Search
CPC ... G06F 16/3322–3325; G06F 16/2425; G06F 16/9537; G06F 16/24578;
(Continued)

(56) References Cited

U.S. PATENT DOCUMENTS 6,480,837 B1 * 11/2002 Dutta ................... G06F 16/951
8,301,639 B1  10/2012 Myllymaki et al.
(Continued)

FOREIGN PATENT DOCUMENTS

WO  WO2004086192 A2 * 10/2004
WO  WO2005006283 A2 *  1/2005
(Continued)

*Primary Examiner* — Srirama Channavajjala
(74) *Attorney, Agent, or Firm* — James J. DeCarlo; Greenberg Traurig, LLP (57) ABSTRACT

A location-aware search assist capability identifies location-aware search query suggestions using location information associated with the location-aware search query suggestions. A user's search query input and location and a location associated with each location-aware search query suggestion candidates may be used to identify a set of search query suggestions for presentation to the user. Location-aware search query suggestion candidates may be ranked in accordance with a closeness of each one's location to the user's location. The ranking may be performed using a score, such as a popularity score associated with each search query suggestion candidate. The location-aware search query suggestion candidates having a location closer to the user's location may be promoted by adjusting each candidate's popularity score upward, and the search query suggestion candidates that are farther away from the user's location may be demoted by adjusting each such candidate's popularity score downward.

20 Claims, 6 Drawing Sheets

(51) Int. Cl.
*G06F 16/9032* (2019.01)
*G06F 16/2457* (2019.01)
*G06F 16/9535* (2019.01)
*G06F 16/242* (2019.01)
*G06F 16/9537* (2019.01)
*G06F 16/29* (2019.01)
*G06F 16/33* (2019.01)

(52) U.S. Cl.
CPC ............ *G06F 16/29* (2019.01); *G06F 16/334* (2019.01); *G06F 16/3325* (2019.01); *G06F 16/90324* (2019.01); *G06F 16/9535* (2019.01); *G06F 16/9537* (2019.01)

(58) Field of Classification Search
CPC .......... G06F 16/90324; G06F 16/9535; G06F 16/29; G06F 16/334
See application file for complete search history.

(56) References Cited

U.S. PATENT DOCUMENTS

| | | | |
|---|---|---|---|
| 8,321,404 B1* | 11/2012 | Mysen | G06F 16/3322 707/713 |
| 8,583,675 B1 | 11/2013 | Haahr et al. | |
| 8,671,106 B1 | 3/2014 | Lee et al. | |
| 8,676,777 B1* | 3/2014 | Prahladka | G06F 16/24578 707/706 |
| 8,676,828 B1 | 3/2014 | Agarwal et al. | |
| 8,694,512 B1 | 4/2014 | Zhdanovich et al. | |
| 8,745,168 B1 | 6/2014 | Singleton et al. | |
| 8,818,715 B2* | 8/2014 | Mahapatro | G01C 21/343 701/426 |
| 9,148,441 B1* | 9/2015 | Tamersoy | G06F 21/566 |
| 9,336,235 B2* | 5/2016 | Hao | G06F 16/9535 |
| 9,367,625 B2* | 6/2016 | Raina | G06F 16/24578 |
| 9,454,530 B2* | 9/2016 | Sabah | G06F 16/435 |
| 9,600,600 B2* | 3/2017 | Glass | G06F 16/951 |
| 9,690,833 B2* | 6/2017 | Barve | G06F 16/22 |
| 2003/0120653 A1* | 6/2003 | Brady | G06F 16/951 |
| 2005/0080786 A1* | 4/2005 | Fish | G06F 16/9537 |
| 2006/0123014 A1* | 6/2006 | Ng | G06F 16/951 |
| 2006/0195435 A1 | 8/2006 | Laird-McConnell et al. | |
| 2006/0248078 A1 | 11/2006 | Gross et al. | |
| 2009/0094221 A1* | 4/2009 | Cameron | G06F 16/3322 |
| 2009/0187515 A1* | 7/2009 | Andrew | G06F 16/9535 707/E17.014 |
| 2011/0072033 A1 | 3/2011 | White et al. | |
| 2011/0184636 A1* | 7/2011 | Rolf | G06F 16/29 707/723 |
| 2011/0184930 A1* | 7/2011 | Pfleger | G06F 16/334 707/E17.108 |
| 2011/0184951 A1* | 7/2011 | Paparizos | G06F 16/3322 707/737 |
| 2011/0202874 A1 | 8/2011 | Ramer et al. | |
| 2012/0036123 A1* | 2/2012 | Hasan | G06F 16/95 707/E17.084 |
| 2012/0047134 A1 | 2/2012 | Hansson et al. | |
| 2012/0136855 A1 | 5/2012 | Ni et al. | |
| 2012/0166416 A1* | 6/2012 | Murdock | G06Q 30/0277 707/711 |
| 2012/0265779 A1 | 10/2012 | Hsu et al. | |
| 2012/0269116 A1* | 10/2012 | Xing | H04L 67/22 370/328 |
| 2012/0278308 A1 | 11/2012 | Zhou | |
| 2013/0066885 A1* | 3/2013 | Komuves | G06Q 50/01 707/748 |
| 2014/0201229 A1 | 7/2014 | Kirazci et al. | |
| 2014/0207746 A1 | 7/2014 | Song et al. | |
| 2014/0207789 A1 | 7/2014 | Lee et al. | |
| 2014/0358661 A1 | 12/2014 | Or et al. | |
| 2014/0379689 A1* | 12/2014 | Huffman | G06F 16/9537 707/711 |
| 2015/0006492 A1* | 1/2015 | Wexler | G06F 16/248 707/694 |
| 2015/0242420 A1* | 8/2015 | Glover | G06F 16/29 707/724 |
| 2015/0242421 A1* | 8/2015 | Glover | G06F 16/24578 707/724 |

FOREIGN PATENT DOCUMENTS

| | | | |
|---|---|---|---|
| WO | WO2008014182 A2 * | 1/2008 | |
| WO | WO2009036372 A2 * | 3/2009 | |
| WO | WO2012075273 A2 * | 6/2012 | |
| WO | WO2013003772 A2 * | 1/2013 | |
| WO | WO2014210193 A2 * | 12/2014 | |
| WO | WO2016040013 A1 * | 3/2016 | |

\* cited by examiner

1. Whether the query has a location
2. What is the local intent score of the query
3. Whether the query's primary intent is local
4. Whether the query has travel intent
5. What is the confidence score of the detected location
6. What is the scope level of the detected location, including country, state, city and DMA
7. Whether this detected location is a point of interest
8. Whether the detected location is at the beginning of the query
9. Whether the detected location is at the end of the query
10. How many tokens does the detected location have

LOCATION-AWARENESS SEARCH ASSISTANCE SYSTEM AND METHOD

CROSS-REFERENCE TO RELATED APPLICATIONS

This application claims the benefit of and is a continuation of U.S. patent application Ser. No. 14/727,081, filed Jun. 1, 2015, titled "Location-Awareness Search Assistance System and Method", which is incorporated by reference herein its entirety.

FIELD OF THE DISCLOSURE

The present disclosure relates to information searching, and more particularly, to a search assistant, which uses location information, e.g., location information indicated by a user's search query, to recommend one or more alternatives to complete the user's query.

BACKGROUND

There is a vast amount of digital information available to computer users. Computer users typically use a search tool that allows them to input a query, which can include words, phrases, etc. The search tool, e.g., a search engine, uses the query to search for and locate a set of search results relevant to the user's query.

SUMMARY

It would be beneficial to assist the user in the user's search. Embodiments of the present disclosure assist a user's search and provide the user with one or more search query recommendations in response to receiving query input, e.g., at least a portion of the user's query input, from the user. In accordance with one or more embodiments, the user's search query input is received prior to receiving input from the user indicating the user's desire to submit the query, e.g., prior to receiving input submitting the query and requesting a search be conducted using the query input. In accordance with one or more embodiments, one or more search query suggestions, or recommendations, can be presented to the user, each search query suggestion is selectable by the user to complete or replace the user's search query. A user's search query suggestion selection can be input with the user's request for a search to be performed using the search query suggestion selection as at least a part of the search criteria.

In accordance with one or more embodiments, the one or more search query suggestions that are location-aware have associated location information. In accordance with at least one such embodiment, the user's search query input, the user's location and the location associated with the location-aware search query suggestion candidates may be used to identify a set of search query suggestions for presentation to the user. In accordance with one or more such embodiments, the location-aware search query suggestion candidates may be ranked in accordance with a closeness of each one's location to the user's location. The ranking may be performed using a score, such as a popularity score that is based on a frequency of occurrence of the search query in query logs, associated with each search query suggestion candidate. By way of some non-limiting examples, the location-aware search query suggestion candidates having a location closer to the user's location may be promoted by adjusting each candidate's popularity score upward, and the search query suggestion candidates that are farther away from the user's location may be demoted by adjusting each such candidate's popularity score downward. A number, N, of the highest-ranking location-aware search query suggestion candidate may be selected for inclusion in a set of search query suggestions that are made available to the user's computing for presentation at the user's computing device.

In accordance with one or more embodiments, a method is provided, the method comprising generating, by a computing device, a database comprising a plurality of candidate search query suggestions, a number of the candidate search query suggestions of the plurality having associated location information; receiving, over a network by the computing device, search query user input from a user computing device; obtaining, over the network by the computing device, location information representing the user's location at the time the search query is input by the user, selecting, by the computing device, one or more search query suggestions from the database using the search query user input, the user's obtained location and the associated location information for the number of candidate search query suggestions, at least a portion of the location information associated with each of the one or more selected search query suggestions matching the user's obtained location; and making, by the computing device, a number of the one or more selected search query suggestions available for display at the user computing device.

In accordance with one or more embodiments a system is provided, the system comprising a computing device comprising a processor and a storage medium for tangibly storing thereon program logic for execution by the processor, the stored program logic comprising generating logic executed by the processor for generating a database comprising a plurality of candidate search query suggestions, a number of the candidate search query suggestions of the plurality having associated location information; receiving logic executed by the processor for receiving, over a network, search query user input from a user computing device; obtaining logic executed by the processor for obtaining, over the network, location information representing the user's location at the time the search query is input by the user; selecting logic executed by the processor for selecting one or more search query suggestions from the database using the search query user input, the user's obtained location and the associated location information for the number of candidate search query suggestions, at least a portion of the location information associated with each of the one or more selected search query suggestions matching the user's obtained location; and making logic executed by the processor for making a number of the one or more selected search query suggestions available for display at the user computing device.

In accordance with yet another aspect of the disclosure, a computer readable non-transitory storage medium is provided, the medium for tangibly storing thereon computer readable instructions that when executed cause at least one processor to generate a database comprising a plurality of candidate search query suggestions, a number of the candidate search query suggestions of the plurality having associated location information; receive, over a network, search query user input from a user computing device; obtain, over the network, location information representing the user's location at the time the search query is input by the user; select one or more search query suggestions from the database using the search query user input, the user's obtained location and the associated location information for the number of candidate search query suggestions, at least a portion of the location information associated with each of the one or more selected search query suggestions matching the user's obtained location; and make a number of the one or more selected search query suggestions available for display at the user computing device.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a system, method and architecture for assisting a user with a search. Embodiments of the present disclosure assist a user's search and provide the user with one or more search query suggestions, or recommendations, in response to receiving query input, e.g., at least a portion of the user's query input, from the user. In accordance with one or more embodiments, the user's query input may be received prior to receiving input from the user indicating the user's desire to submit the query, e.g., prior to receiving the user's submission of a query requesting a search be conducted using the query input. In accordance with one or more embodiments, prior to receiving a "submit" and in response to the user inputting at least a portion of the user's search query, embodiments of the present disclosure identify a set of one or more search query suggestions, which comprises one or more location-aware search query suggestions. The set of search query suggestions, which may include location-aware search query suggestions as well as other search query suggestions, can be made available for presentation at the user's computing device. Each query suggestion is selectable by the user. A user's query suggestion selection can augment or replace the user's search query input and may become at least a part of the user's request for a search.

In accordance with one or more embodiments, the one or more query suggestions that have associated location information are location-aware. In accordance with at least one such embodiments, the user's search query input and location as well as a location information associated with location-aware query suggestion candidates may be used to identify a set of query suggestions for the user.

In accordance with one or more embodiments, search query suggestion candidates may be ranked according to a score associated with each candidate. In accordance with one or more embodiments, the score may comprise a popularity score, which may be determined based on a frequency of occurrence of the candidate in one or more query logs. The popularity scores of location-aware search query candidates may be adjusted based on closeness or proximity to the user's location. Such adjustment provide a way to prioritize location-aware search query suggestion candidates using location information. Search query suggestion candidates that are closer to the user's location can be promoted by adjusting each one's popularity score upward, and search query suggestion candidates that are distant to the user's location may be demoted by adjusting each one's popularity score downward. A number, N, search query suggestion candidates may be selected to be presented to the user. The selected search query suggestion candidates comprise some number of location-aware search query suggestion candidates and may optionally comprise non-location-aware search query suggestion candidates. By way of a non-limiting example, search query suggestion candidates with locations that are close to a user's location, relative to other search query suggestion candidates, can be selected instead of, and/or ranked higher than, other search query suggestion candidates, including location-aware search query suggestion candidates that are not as close, relative to the selected location-aware candidates, to the user's location.

While search suggestion candidates might be selected based on popularity alone, this does not take into account the user's location, such that the same search query input from users having different locations results in the same set of search query suggestions being provided to those users regardless of the users' locations. By way of a non-limiting example, the same set of search query suggestions selected based solely on popularity is provided to a user San Francisco, Calif. and a user in Miami, Fla.; however, each of these users may be more interested in a set of search suggestions suited to the user's location.

By way of a non-limiting example, assume Mr. Goodman is in Sunnyvale, Calif., and he wants to locate a Japanese restaurant nearby. Mr. Goodman types "japanese restaurant" into a search field, and might receive the following set of recommended suggestions before submitting his search request: "japanese restaurant," "japanese restaurant in singapore," "japanese restaurant menu," "japanese restaurant chicago," "japanese restaurant new york," "japanese restaurant los angeles," "japanese restaurant orlando," "japanese restaurant atlanta." and "japanese restaurant supply." Since many of the locations provided in the suggestions are big cities and many people travel to these locations, it makes sense that these suggestions are selected in a case that popularity is the basis for determining the suggestions. Unfortunately, if Mr. Goodman is looking for a Japanese restaurant in Sunnyvale, Calif., the set of recommendations are not helpful to him.

Using the above example, a search assistant in accordance with embodiments of the present application may use Mr. Goodman's location and the locations associated with location-aware search query suggestion candidates to identify a set of search query suggestions, which includes one or more search query suggestions having associated locations that are close to Mr. Goodman's location, and location-aware query suggestions with locations closers to Mr. Goodman's location may be promoted by adjusting each one's popularity higher.

Figure 1:
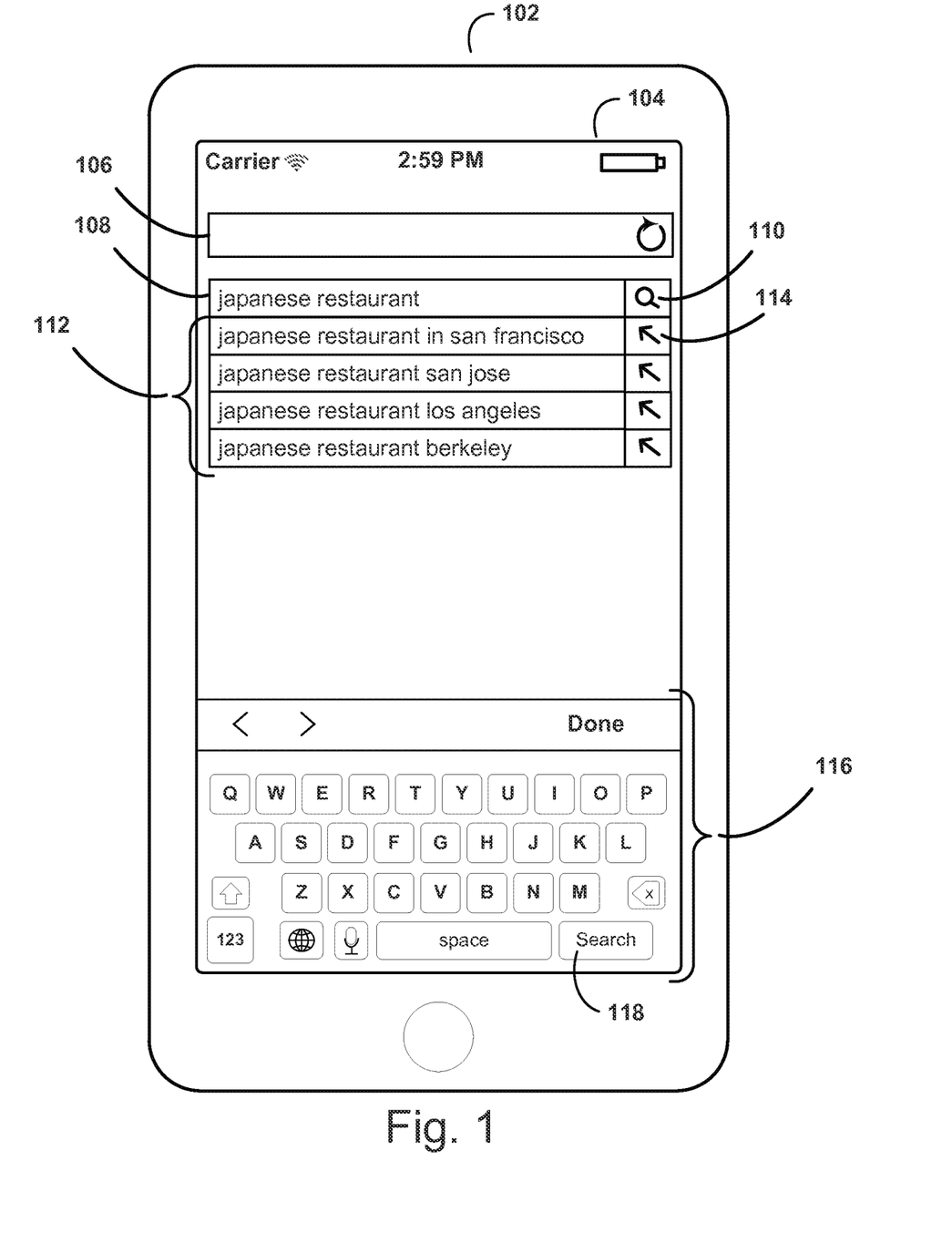
FIG. 1 provides a user interface example in accordance with one or more embodiments of the present application.

FIG. 1 provides a user interface example in accordance with one or more embodiments of the present application. In accordance with one or more such embodiments, some or all of the user interface may be transmitted to a user computing device, such as user computing device 102 shown in FIG. 1. In the example, user computing device 102 is a smartphone; however, it should be apparent that any computing device may be used with embodiments of the present application.

User computing device 102 comprises a displayed user interface 104, which comprises a URL input field 106, a search query input field 108, a search query submission control 110 represented as a magnifying glass icon in the example, and a portion 112 displaying a set of search query suggestions. User interface portion 112 comprises a control 114 represented as an arrow icon in the example, which may be used to receive input from the user indicating the user's desire to have a corresponding suggestion supplement or replace the user's query input.

In accordance with one or more embodiments, keyboard 116 may be used by the user to input a search query in field 108. As the search query input in field 108 is received from the user, embodiments of the present disclosure can process the user's search query input, prior to receiving input from the user via control 110 or search button 118, and generate the set of search query suggestions, which comprises one or more search query suggestions, displayed in portion 112 of the user interface 104. The set of search query suggestions comprising one or more search query suggestions can be based on the search query input, such as "japanese restaurant" in the example of FIG. 1, the user's location and location information associated with location-aware search query candidates.

Using the above example, Mr. Goodman's search query input and Sunnyvale, Calif. location and location information associated with the location-aware search query suggestion candidates can be used to identify the set of search query suggestions displayed in portion 112 of user interface 104. Rather than receiving suggestions for Japanese restaurants in Singapore, Chicago or New York, none of which are nearby Mr. Goodman's location, the set of suggested search queries provided in accordance with one or more embodiments are selected using Mr. Goodman's location and location information associated with the location-aware search query suggestion candidates. The resulting set of search query suggestions displayed in portion 112 comprise a number of suggestions nearby Mr. Goodman's location. In accordance with one or more embodiments, the set of search query suggestions selected from the candidate search queries may be a number, N, search queries whose locations are within a threshold distance of the user's location and/or whose locations are closest to the user's location relative to the unselected search queries.

Of course, any criteria may be used in addition to location, such as and without limitation popularity. By way of a non-limiting example, the set of search query suggestions selected from the candidate search queries may include suggestions selected based on proximity to the user's location and based on popularity. In accordance with one or more embodiments, a popularity of a search query may be determined based on a number of occurrences of the search query in a log of queries may be adjusted upward or downward based on the search query's associated location and the user's location.

As input is received via search query input field 108, suggested search queries may be identified using the received input and displayed in portion 112 of user interface 104. The user may select one of the suggested search queries, such as and without limitation by selecting a suggested search query's text or by selecting the icon 114 corresponding to the suggested search query. In response to receiving input indicative of a user's selection of a suggested search query, search query input field 108 can be updated to display the selected search query suggestion. Additionally, a new set of suggested search queries may be provided in portion 112 based on the selected search query suggestion. The user may request that a search be conducted using the search query displayed in field 108 as criteria for a search by selecting icon 110 or button 118.

Figure 2:
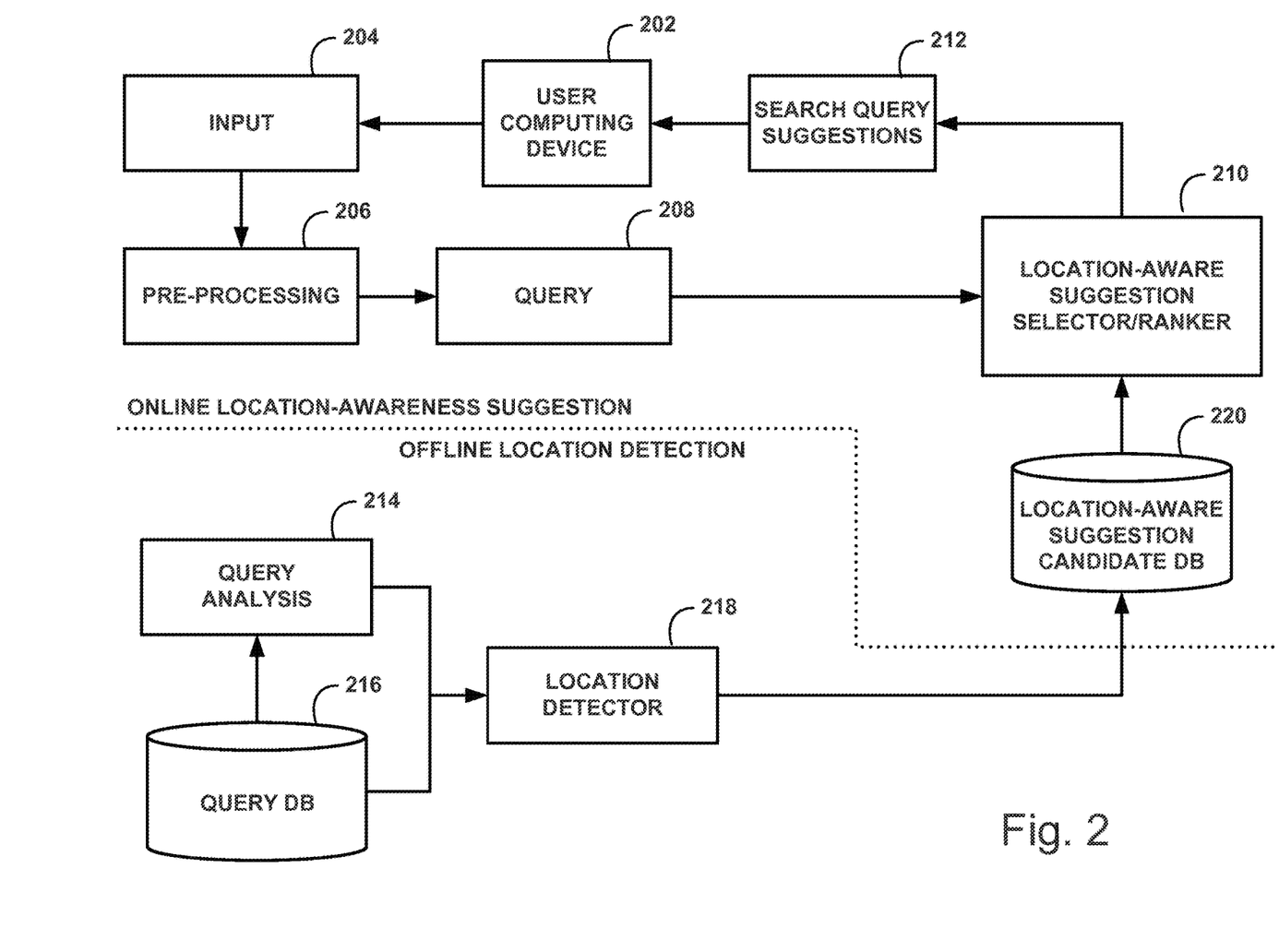
FIG. 2 illustrates components of a system providing location-aware query suggestions in accordance with one or more embodiments of the present disclosure.

FIG. 2 illustrates components of a system providing location-aware search query suggestions in accordance with one or embodiments of the present disclosure. Input 204 may be received from user computing device 202, which may correspond to device 102 or other user computing device. As described in connection with FIG. 1, input 204 may be search query input received prior to receiving input from the user requesting that a search be conducted using the search query input. Input 204 may comprise one or more search terms received from a user of computing device 202. With reference to FIG. 1, input 204 may correspond to the contents of field 108, for example.

In accordance with one or more embodiments, input 204 may be received by a component of an online location-aware search assist suggestion system. In the example shown in FIG. 2, a pre-processing component 206 of such an online system may receive the input 204 and process it before it becomes input to location-aware suggestion selector and ranker component 210. By way of a non-limiting example, the pre-processing component 206 may include processing to tokenize the input 204 to break the input 204 into segments, or tokens. A token may be defined as an alphanumeric string which occurs delimited by whitespace or punctuation, for example. By way of a further non-limiting example, the pre-processing component 206 may parse the input 204 to locate terms and operators, such as Boolean operators, remove stop words and perform stemming on the input 204, etc.

The pre-processing component 206 generates query 208, which is input to location-aware suggestion component 210. The component 210 selects a number of search query suggestions 212 comprising one or more location-aware search query suggestions, which are made available to the user computing device 202. With reference to FIG. 1, the search query suggestions 212 may be received by the user computing device 102 and displayed in portion 112 of the user interface 104.

In accordance with one or more embodiments, the location-aware suggestion component 210 may comprise a ranking capability, which may be used to rank the search query suggestions 212 prior to making them available to the user computing device 202. In accordance with one or more embodiments, the location-aware suggestion component 210 selects the search query suggestions 212 from a plurality of candidate search query suggestions stored in location-aware suggestion candidate database 220, which may generated using an offline process.

By way of a non-limiting example, the offline process may comprise a query analysis component, or query analyzer, 214 configured to analyze historical query data from a plurality prior query activity logged by one or more search engines. Query database 216 may be generated using data from query logs maintained by the one or more search engines. In accordance with one or more embodiments, each item in the query database 216 corresponds to one query and may have a number of associated attributes, which attributes include the query's search popularity. A query's popularity may be determined based on a frequency of occurrence of the query in the query logs. The query logs may further include user click information.

Query analyzer 214 is configured to semantically analyze information associated with a given query, including the query itself, to identify one or more intents of the query, such as and without limitation a query's local intent, travel intent, etc., the query's keywords and their attributes such as and without limitation a location for the query, a confidence score for the detected location, a detected location's scope, etc.

Location detector 218 receives the output of the query analyzer 214 for queries in the query database 216 and is configured to generate the location-aware 220 suggestion candidate database 220. In accordance with one or more embodiments, location detector 218 may comprise a model for detecting locations associated with queries. In accordance with one or more such embodiments, the model may be a trained model, such as and without limitation a decision tree model. In accordance with one or more embodiments, the trained model may be generated using a training data set labeled by editors, which labels may include location information. Of course, it should be apparent that location detector 218 may be other than a model, such as a set of rules.

Figure 3:
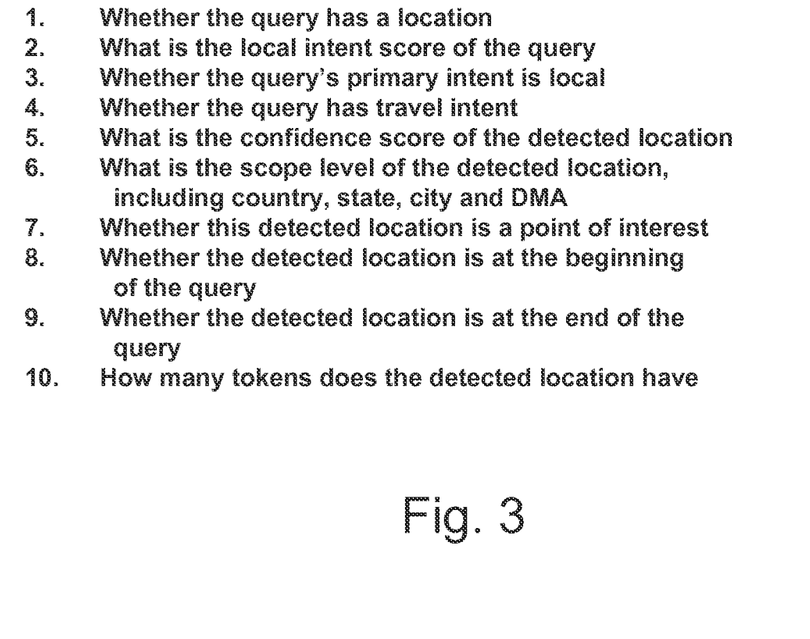
FIG. 3 provides some examples of features in accordance with one or more embodiments of the present disclosure.

In accordance with one or more embodiments, location detector 218 uses features of the query to determine whether or not the query has an associated location and to determine the associated location. FIG. 3 provides some examples of features used by the location detector 218. In accordance with one or more embodiments, features 1, 2, 4, 5 and 6 can be provided by query analyzer 214, and used by the location detector 218 to determine whether or not a given query has an associated location and what is the query's associated location. The remaining items can be determined by location detector 218.

With reference to the example features shown in FIG. 3, feature 1 represents, or indicates, whether the query has a location and the location associated with the query, if there is one, and feature 5 provides a confidence score indicating a confidence in the detected location. Feature 2, which is provided by query analyzer 214, represents a probability, or likelihood, that the query has a local intent, which may be an intent to retrieve information for local use or within a given geographic area. By way of some non-limiting examples, a query with local intent may be seeking information about a business, establishment, point of interest, location etc. that is in a given geographic area, such as and without limitation seeking business hour, directions, address, product availability at a local store, restaurant or hotel, etc. information. Feature 3 is related to feature 2, and indicates a probability, or likelihood, that a primary intent of a query is a local intent. By way of a non-limiting example, feature 3 may be determined by comparing its probability, or likelihood, with the probability, or likelihood, associated with other intents, e.g., travel intent, etc.

Feature 4 represents a probability, or likelihood, that the query has a travel intent. Feature 6 provides a level of scope of a detected location, such as and without limitation whether the detected location is a country, a state, a city or a designated market area (DMA). By way of a non-limiting example, a DMA may correspond to a geographic region whose population receives the same or similar media offerings, such as television and radio station offerings, newspapers, internet content, etc. Feature 7 indicates whether a detected location for the query is a point of interest (POI). Feature 8 indicates whether a detected location of the query is at the beginning of the query, and feature 9 indicates whether the detected location is at the end of the query. Feature 10 indicates how many of the tokens of the query are used for the detected location. By way of a non-limiting example, feature 10 might have a value of 1 for a detected location of Chicago and a value of 2 for a detected location of San Jose.

In the above examples, a probability or likelihood, may be expressed in different ways and may be expressed as a percentage, such as and without limitation from 0 to 100 percent, as a yes/no, on/off, etc.

In accordance with one or more embodiments, if the location detector 218 concludes that a query has an associated location, the query's associated location is stored with the query in location-aware suggestion candidate database 220. By way of a non-limiting example, the location information can comprise an identifier, or ID, representing a location, e.g., a geographic location. By way of a further non-limiting example, location detector 218 can include an identifier such as 2502265, which corresponds to Sunnyvale, Calif., USA, an identifier such as 23424977, which corresponds to USA, etc.

Referring again to FIG. 2, in accordance with one or more embodiments, location-aware suggestion component 210 identifies a location associated with the user. By way of a non-limiting example, the user's location may be determined using the user's internet protocol (IP) address and/or global positioning system (GPS) information provided by the user computing device 202. In a case that a user location cannot be detected, search suggestions other than location-aware search suggestions may be provided as a search query suggestions 212. If the location-aware suggestion component 210 is able to identify a location for the user, it may use the user's search query input and location and location information associated with the location-aware query suggestions identified by the location detector 218 to select a set of search query suggestions 212, which may comprise one or more location-aware search query suggestions.

In accordance with one or more embodiments, if a location is identified for the user, one or more location-aware query suggestions may be selected from the location-aware suggestion candidate database 220 using the user's location and the location(s) associated with queries in the database 220. In accordance with one or more such embodiments, the user's search query input may be used to search for candidates that have the same or similar prefix.

One or more query suggestions without an associated location may be selected in addition to the one or more location-aware query suggestions selected using their respective associated location(s). In such a case, the query suggestions without an associated location may be displayed separately, such as below the location-aware query suggestions. Selection criteria such as popularity that is based on frequency of occurrence, and is not adjusted based on location, may be used to select any search queries without associated location(s).

In accordance with one or more such embodiments, location-aware search query suggestions may prioritized based an adjusted popularity, which adjustment may be based on an outcome of one or more matching operations performed using the location-aware suggested query's location and the user's location. In accordance with one or more such embodiments, a location-aware query suggestion's associated popularity, which may be stored in the location-aware suggestion candidate database 220, may correspond to a frequency of occurrence of the query in the query database 216.

By way of a further non-limiting example, a popularity score associated with a location-aware search query suggestion that fails to match some or all of the user's location may be decreased by some factor, and/or the popularity score associated with a location-aware search query suggestion that matches at least a portion of the user's location may be increased by some factor.

In accordance with one or more embodiments, if a location-aware search query suggestion's associated location and the user's associated location do not identify the same country, in other words the query suggestion's associated location and the user's location are not in the same country, a scale, or scaling factor, may be applied to the query suggestion's popularity to decrease its popularity. The popularity may be decreased by a scaling factor, such as and without limitation 0.001, for example.

By way of a non-limiting example, in a case that the location-aware query suggestion's associated location and the user's location are in the same country but not in the same state, another factor, or scaling factor, such as and without limitation a factor of 0.5, may be applied to the location-aware query suggestion's popularity to reduce the query suggestion's popularity. In the example provided, the factor used for mismatched state locations results in a smaller decrease than in the case of mismatched country locations. It should be apparent that embodiments of the present disclosure are not limited to mismatches in country and state for purposes of scaling and or ranking. By way of a no-limiting example, a search suggestion's popularity may be decreased by some scaling factor in a case that there is a city mismatch. Such a scaling factor may be set so that unless the search suggestion has a high popularity score, the search suggest is likely to be removed from consideration for selection, for example.

In accordance with one or more embodiments, a score, such as and without limitation popularity score, for a search suggestion may be increased if some or all of search suggestion's location matches the user's location. By way of some non-limiting examples, the search suggestion's popularity score may be increased by some scaling factor in cases that the search suggestion's location information identifies a state that matches the user's state location, the search suggestion's location information identifies a DMA matching the user's DMA indicated by the user's location, or the search suggestion's location information identifies a city that matches the city identified by the user's location.

In accordance with one or more embodiments, the scaling factor used for a matching state may be less than the scaling factor used for a matching DMA, and the scaling factor used for a matching city. In accordance with one or more such embodiments, a smaller scaling factor, relative to another larger scaling factor, results in a smaller increase in the search suggestion's score relative to the other larger scaling factor. By way of a non-limiting example, a scaling factor of 10 applied to a popularity score of 50 results in a scaled popularity score of 500, while a scaling factor of 100 applied to the same popularity score of 50 results in a scaled popularity score of 5000.

Figure 4:
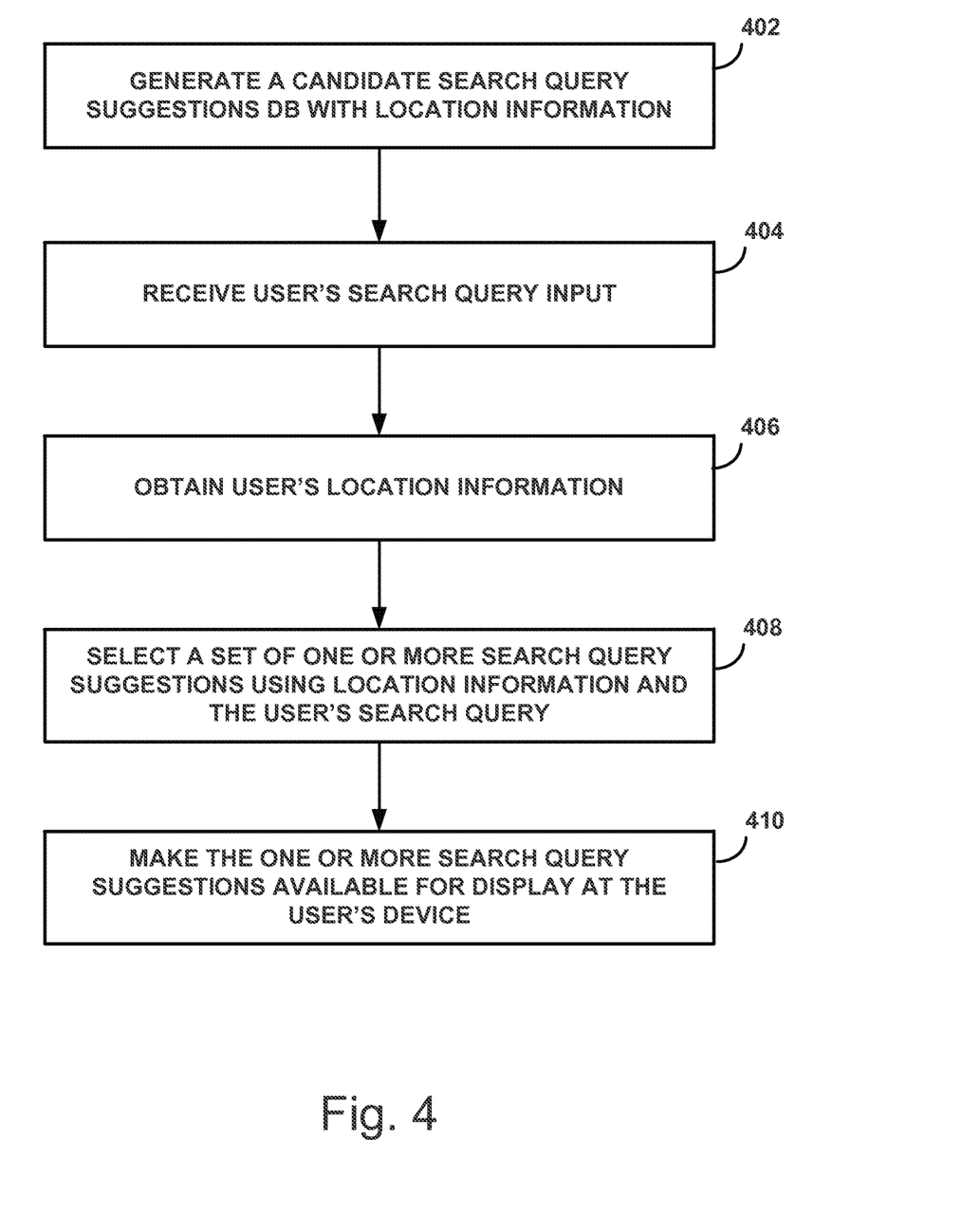
FIG. 4 is a process flow example in accordance with one or more embodiments of the present disclosure.

FIG. 4 is a process flow example in accordance with one or more embodiments of the present disclosure. At step 402, a candidate search query suggestions database, such as location-aware suggestion candidate database 220, is generated. The database includes location information associated with a number of the candidate search query suggestions stored in the database. In addition, the database stores a popularity score, which may correspond to a frequency of occurrence of the search query in historical query log data. The associated location information may comprise the geographic location, which may include information identifying one or more of city, state, DMA, country, etc. It should be apparent that some of these locations, or areas, may be determined using other one or more of these locations, or areas. By way of a non-limiting example, city information may be used to identify the states, DMA, country, etc.

At step 404, search query user input is received. By way of a non-limiting example, the search query user input can correspond to input 204 received from user computing device 202. At step 406, the user's location information is obtained. The user's obtained location information represents the user's location at the time the search query is input by the user. By way of a non-limiting example, such information may be obtained using the user's IP address, GPS information generated by the user's computing device, etc. It should be apparent that any technique now known or later developed for obtaining a user's location information may be used with embodiments of the present disclosure.

At step 408, one or more search query suggestions are selected from the plurality of candidate search query suggestions in the database using the user's obtained location information, the associated location information for the number of candidate search query suggestions and the search query user input.

In accordance with one or more embodiments, the search query user input may be used to identify the candidate search query(s) having the same or similar query terms as the user's search query. The matching may use a prefix matching algorithm, for example. The location information associated with the identified candidate search query(s) may be used to identify which ones of the identified candidate search query (s) are within a certain proximity of the user's location.

In accordance with one or more embodiments, a scaling factor may be applied to the popularity score of each of the identified candidate search query(s) using the candidate search query's location information and the user's location. In accordance with one or more such embodiments, an identified candidate search query's popularity score may be adjusted downward if its country or state location does not match the user's country or state location, or adjusted upward if its DMA, state or city matches the user's DMA, state or city. The identified candidate search query(s) may be ranked according to each one's respective popularity score, which may or may not have been adjusted.

A number, N, of the identified candidate search query(s) are selected for the set. The selected query(s) may be the N top-ranked query(s), the N query(s) closest to the user's location, or some combination thereof.

At step 410, a number of the one or more search query suggestions selected at step 408 are made available for display at the user's device. By way of a non-limiting example, the set of search query suggestions may be transmitted via a communication network, such as an electronic communication network, to the user's device.

Figure 5:
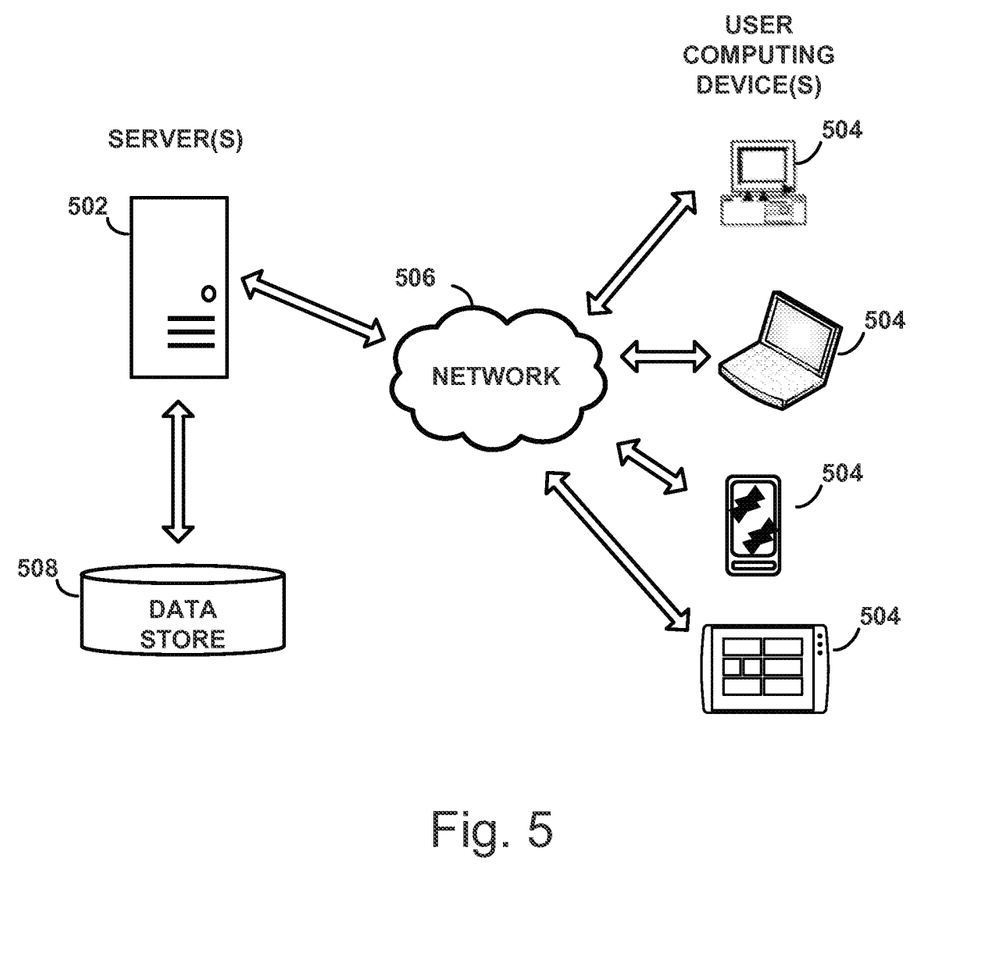
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices, e.g., one or more servers, user devices, such as user computing devices 102 and 201, or other computing device, are configured to comprise functionality described herein. For example, a computing device 502, alone or in combination with user computing device 504, can be configured to execute program code, instructions, etc. to provide functionality in accordance with one or more embodiments of the present disclosure.

Computing device 502 can serve content to user computing devices 504 using a browser application via a network 506. Data store 508, which can include databases 216 and 220, query logs, etc., can be used to store program code to configure a server 502 to functionality in accordance with one or more embodiments of the present disclosure.

The user computing device 504, which may correspond to user computing device 102 or 202, can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computing device 504 can include one or more processors, memory, a removable media reader, network interface, display and interface, and one or more input devices, e.g., keyboard, keypad, mouse, etc. and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present invention. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating electronic communications networks and/or digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 5. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 6:
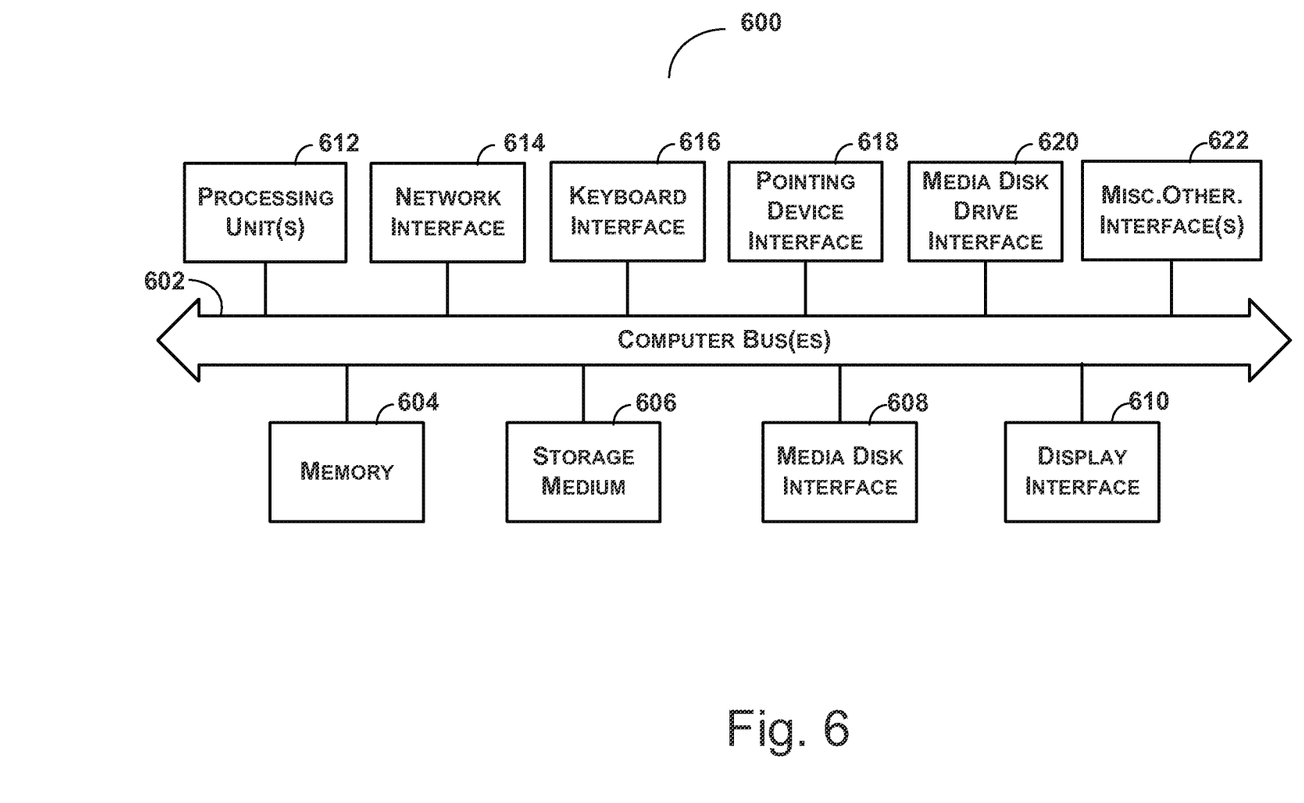
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM. EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   identifying, via a computing device, a plurality of search queries having an associated geographic location, a search query of the plurality being identified as having an associated geographic location using a trained machine model and a set of features determined for the search query;
   obtaining, via the computing device, search query input of a user and geographic location information indicating the geographic location of the user's device;
   selecting, via the computing device and from the plurality of search queries, a set of search queries using the user's search query input, at least a portion of each search query of the set of selected search queries matching at least a portion of the user's search query input;
   determining, via the computing device and for each search query of the set of selected search queries, a popularity score using a frequency of occurrence of the search query in at least one search query log;
   making, via the computing device and for each search query of the set of selected search queries, a determination whether to adjust the popularity score, the determination comprising adjusting upward the popularity score of a respective search query of the set in response to finding a match between the geographic location of the user's device and the associated geographic location of the respective search query;
   determining, via the computing device, an ordered set of search queries using the popularity score adjusted upward for the respective search query and the popularity score of each other search query of the set of search queries;
   selecting, via the computing device, a number of search queries from the ordered set of search queries; and
   making, via the computing device, the number of search queries available to the user in a user interface display of the user's device as search query suggestions in response to the search query input of the user.

2. The method of claim 1, further comprising:
   for a search query of the plurality, analyzing information associated with the search query to determine the set of features.

3. The method of claim 2, the associated information comprising the terms of the search query.

4. The method of claim 3, the set of features determined for the search query comprising information indicating a position of geographic location information detected among the terms of the search query.

5. The method of claim 4, the position among the terms of the search query indicating that the geographic location information is either at the end or the beginning of the search query.

6. The method of claim 3, the set of features comprising information indicating the number of terms of the search query indicating geographic location information.

7. The method of claim 2, the set of features determined for the search query comprising information indicating a presence or absence of geographic location information among the associated information.

8. The method of claim 2, the set of features determined for the search query comprising information indicating a confidence level in connection with geographic location information detected among the associated information.

9. The method of claim 2, the set of features determined for the search query comprising information indicating a level of scope of a geographic location detected among the information associated with the search query.

10. The method of claim 2, the set of features determined for the search query comprising information indicating whether or not a geographic location detected among the information associated with the search query corresponds to a point of interest.

11. The method of claim 2, the set of features determined for the search query comprising a probability that the search query has a local intent to retrieve information for local use.

12. The method of claim 11, the set of features determined for the search query comprising a probability that a primary intent of the search query is local.

13. The method of claim 2, the set of features determined for the search query comprising a probability that the search query has a travel intent.

14. A non-transitory computer-readable storage medium tangibly encoded with computer-executable instructions that when executed by a processor associated with a computing device perform a method comprising:

identifying a plurality of search queries having an associated geographic location, a search query of the plurality being identified as having an associated geographic location using a trained machine model and a set of features determined for the search query;

obtaining search query input of a user and geographic location information indicating the geographic location of the user's device;

selecting, from the plurality of search queries, a set of search queries using the user's search query input, at least a portion of each search query of the set of selected search queries matching at least a portion of the user's search query input;

determining, for each search query of the set of selected search queries, a popularity score using a frequency of occurrence of the search query in at least one search query log;

making, for each search query of the set of selected search queries, a determination whether to adjust the popularity score, the determination comprising adjusting upward the popularity score of a respective search query of the set in response to finding a match between the geographic location of the user and the associated geographic location of the respective search query;

determining an ordered set of search queries using the popularity score adjusted upward for the respective search query and the popularity score of each other search query of the set of search queries;

selecting a number of search queries from the ordered set of search queries; and making the number of search queries available to the user in a user interface display of the user's device as search query suggestions in response to the search query input of the user.

15. The non-transitory computer-readable storage medium of claim 14, further comprising:

for a search query of the plurality, analyzing information associated with the search query to determine the set of features.

16. The non-transitory computer-readable storage medium of claim 15, the associated information comprising the terms of the search query.

17. The non-transitory computer-readable storage medium of claim 16, the set of features determined for the search query comprising information indicating a position of geographic location information detected among the terms of the search query.

18. The non-transitory computer-readable storage medium of claim 17, the position among the terms of the search query indicating that the geographic location information is either at the end or the beginning of the search query.

19. The non-transitory computer-readable storage medium of claim 16, the set of features comprising information indicating the number of terms of the search query indicating geographic location information.

20. A computing device comprising:
a processor;
a non-transitory storage medium for tangibly storing thereon program logic for execution by the processor, the program logic comprising:

identifying logic executed by the processor for identifying a plurality of search queries having an associated geographic location, a search query of the plurality being identified as having an associated geographic location using a trained machine model and a set of features determined for the search query;

obtaining logic executed by the process for obtaining search query input of a user and geographic location information indicating the geographic location of the user's device;

selecting logic executed by the processor for selecting, from the plurality of search queries, a set of search queries using the user's search query input, at least a portion of each search query of the set of selected search queries matching at least a portion of the user's search query input;

determining logic executed by the processor for determining, for each search query of the set of selected search queries, a popularity score using a frequency of occurrence of the search query in at least one search query log;

making logic executed by the processor for making, for each search query of the set of selected search queries, a determination whether to adjust the popularity score, the determination comprising adjusting upward the popularity score of a respective search query of the set in response to finding a match between the geographic location of the user and the associated geographic location of the respective search query;

determining logic executed by the processor for determining an ordered set of search queries using the popularity score adjusted upward for the respective search query and the popularity score of each other search query of the set of search queries;

selecting logic executed by the processor for selecting a number of search queries from the ordered set of search queries; and making logic executed by the processor for making the number of search queries available to the user in a user interface display of the user's device as search query suggestions in response to the search query input of the user.

* * * * *